United States Patent [19]

Sherblom

[11] Patent Number: 4,858,697

[45] Date of Patent: Aug. 22, 1989

[54] LAWN AERATOR

[76] Inventor: Paul A. Sherblom, 15 Iowa St., Worcester, Mass. 01602

[21] Appl. No.: 164,449

[22] Filed: Mar. 4, 1988

[51] Int. Cl.⁴ ............................................. A01B 45/02
[52] U.S. Cl. ...................................... 172/21; 172/350; 172/554; 172/519; 152/210
[58] Field of Search ............... 172/554, 540, 542, 544, 172/521, 519, 522, 350; 152/208, 209, 210, 170, 173, 175, 185

[56] References Cited

U.S. PATENT DOCUMENTS

| | | | |
|---|---|---|---|
| 1,898,214 | 2/1933 | Richards | 172/554 X |
| 2,535,299 | 12/1950 | Leach | 152/210 X |
| 2,741,968 | 4/1956 | Harris | 172/21 |
| 3,547,204 | 12/1970 | Urban | 172/554 |
| 3,838,894 | 10/1974 | Reedy | 152/210 |

FOREIGN PATENT DOCUMENTS 198241  5/1923  United Kingdom .................. 172/21

Primary Examiner—Richard J. Johnson
Attorney, Agent, or Firm—Blodgett & Blodgett

[57] ABSTRACT

An attachment for a lawn roller which includes an elongated sheet of flexible material for covering the outer cylindrical surface of the lawn roller that the ends of the sheet abut. The ends of the sheet are provided with complementary connectors to enable the sheet to be removably attached to the roller. The sheet is provided with a plurality of rigid pins which project from the outer face of the sheet when it is applied to the roller or penetrating the top soil of a lawn or garden as the roller is rolled along the surface of the soil.

12 Claims, 2 Drawing Sheets

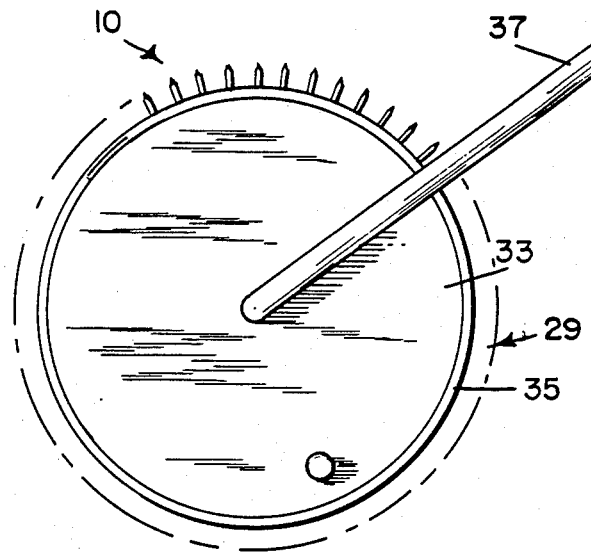
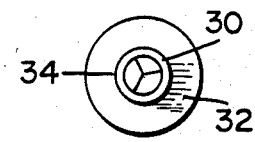
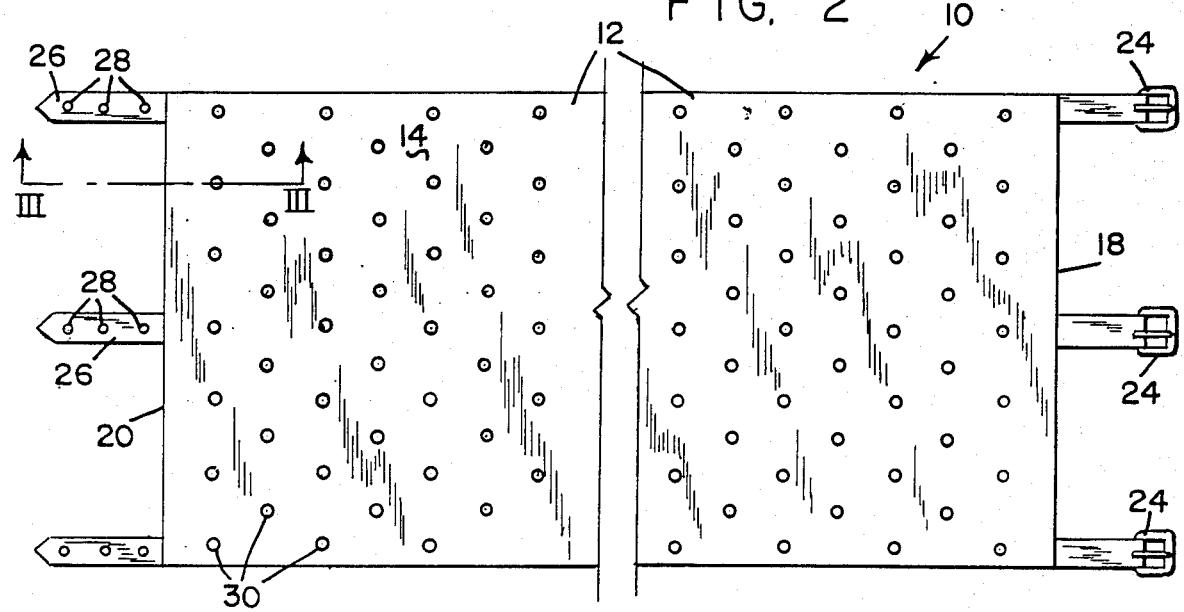
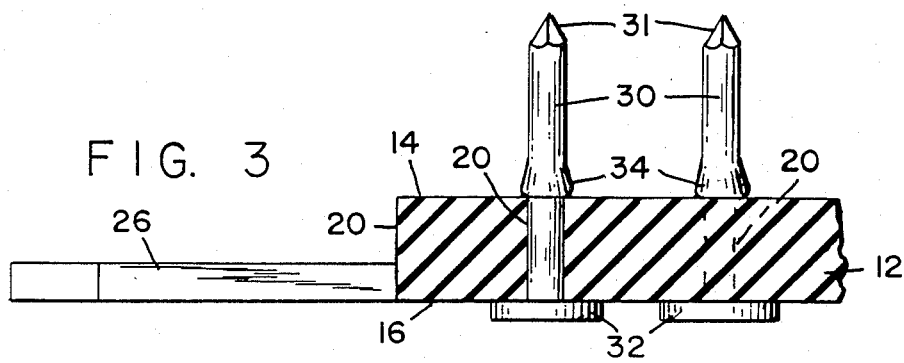

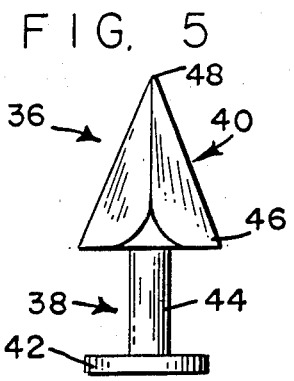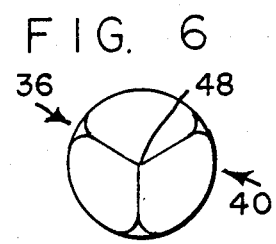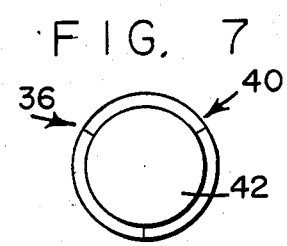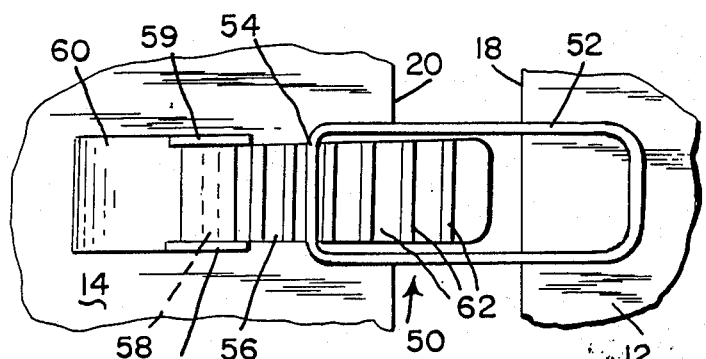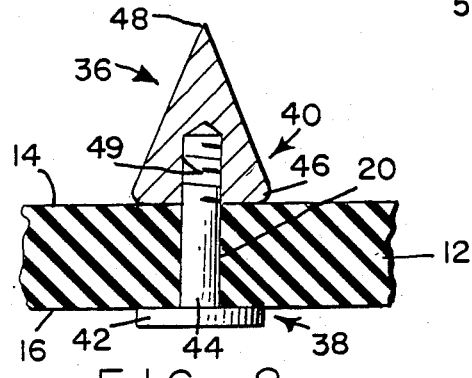

LAWN AERATOR

BACKGROUND OF THE INVENTION

The present invention is directed to an attachment for a conventional cylindrical lawn roller for the purpose of forming aeration holes in the lawn as it is being rolled.

The purpose of a lawn roller is to make the lawn surface smooth or even. One of the negative side effects of lawn rolling is to pack down the top soil. If the top soil is packed too hard, water tends to run off rather than penetrate the soil. This also makes it difficult to lime and fertilize the lawn. It also makes it difficult to seed a new lawn. The aeration of the soil is essential for a healthy lawn. These and other difficulties which have been experienced with conventional lawn rollers had been obviated by the present invention.

It is, therefore, a principal object of the present invention to provide an attachment for a lawn roller which creates multiple punctures in the top soil of the lawn as it is being rolled.

It is another object of the invention to provide a removable attachment for a lawn roller for aerating the top soil of the lawn.

A further object of the invention is to provide an attachment for a lawn roller which includes a plurality of replaceable pins for puncturing the top soil of the lawn.

A still further object of the present invention is to provide an attachment for a lawn roller which is simple in construction, easy to use, and capable of a long life of useful service.

With these and other objects in view, as will be apparent to those skilled in the art, the invention resides in the combination of parts set forth in the specification and covered by the claims appended hereto.

SUMMARY OF THE INVENTION

In general, the present invention consists of an aeration attachment for a conventional lawn roller. The attachment comprises an elongated sheet of flexible material for covering the outer cylindrical surface of the lawn roller, a plurality of rigid pins which are attached to the sheet and which project outwardly from the outer face surface of the sheet, and means for removing and attaching the sheet to the roller.

BRIEF DESCRIPTION OF THE DRAWINGS

The character of the invention, however, may be best understood by reference to one of its structural forms as illustrated by the accompanying drawings, in which:

FIG. 1 is a side elevational view of a lawn roller attachment, embodying the principles of the present invention, and shown applied to a convention lawn roller, FIG. 2 is a plan view of the attachment with portions broken away, FIG. 3 is a fragmentary vertical cross-sectional view of the lawn roller attachment, taken along the line III—III of FIG. 2, FIG. 4 is a plan view of one of the aeration pins, FIG. 5 is a side elevational view of a modified aeration pin, FIG. 6 is a top plan view of the modified aeration pin of FIG. 5, FIG. 7 is a bottom plan view of the modified aeration pin of FIG. 5, FIG. 8 is a vertical cross-sectional view of the modified aeration pin of FIG. 5, shown in operating position on the attachment of the present invention, and FIG. 9 is a plan view of a modified connecting means for the attachment of the present invention.

DESCRIPTION OF THE PREFERRED EMBODIMENT

Referring first to FIGS. 1–4, the lawn roller attachment of the present invention is generally indicated by the reference numeral 10, and comprises an elongated sheet 12 of flexible material and a plurality of aeration pins 30, which are removably attached to the sheet. The sheet 12 has an outer face surface 14 and an inner face surface 16, which is opposite to the face surface 14. One end of the sheet has a first end edge 18, and the opposite end of the sheet has a second end edge 20. The sheet 12 has a plurality of apertures 20 which extend from one face surface 14 to the opposite face surface 16. A plurality of buckles 24 are fixed to the first end edge 18. A plurality of straps 26 are fixed to the second end edge 20. Each strap 26 has a plurality of holes 28. The straps 26 are complementary with the buckles 24 and constitute, with the buckles 24, means for removably attaching the sheet to the outer cylindrical surface of a conventional lawn roller such as the lawn roller 29 shown in FIG. 1.

The pins 30 are located in the apertures 20 of the sheet 12, see particularly FIG. 3. Each pin 30 comprises an inner circular flange 32 which bears against the inner face surface 16, and an outer circular flange 34 which bears against the outer face surface 14. Each pin 30 has a pointed end 31. The outer flange 34 tapers inwardly toward the outer end of the pin. The sheet 12 is preferably made of elastomeric material such as natural or synthetic rubber. Each pin 30 is attached to the sheet 12, by inserting the pointed end 31 into the aperture 20, and forcing the flange 34 through the aperture 20 until it reaches the outer surface 14, and the inner flange 32 abuts the inner face surface 16. Flanges 34 and 32 essentially lock the pin in position on the sheet 12 so that the pin extends outwardly from the sheet at a right angle to the outer surface 14. However, if the pin 30 becomes worn or broken during use it can be removed from the sheet 12 by forcing the flange 34 through the aperture 20 due to the elastomeric nature of the material of the sheet 12.

Referring particularly to FIG. 1, the lawn roller 29 comprises a cylindrical drum 33 which has an outer cylindrical surface 35, and an elongated pushing handle 37. The attachment 10 is applied to the roller 29 by laying the inner surface 16 against the outer cylindrical surface 35, of the roller, and attaching the straps 26 to the buckles 24 to secure the attachment 10 to the roller 29, as shown in FIG. 1. When the attachment 10 is attached to the roller 29, all of the pins 30 extend outwardly and radially from the horizontal axis of the drum 33. When the roller 29 is rolled over the surface of a lawn, the pins 30 penetrate the outer surface of the top soil of the lawn. This piercing of the soil aerates the soil and makes it easier to apply fertilizer lime and water to the lawn. The invention is also useful for starting a new lawn by breaking up hard packed top soil and also to provide minor cultivation in a garden. The pins loosen the top of the garden soil to facilitate weed removal.

Referring to FIGS. 5–8, there is shown a modified pin which is generally indicated by the reference numeral 36. Pin 36 comprises an inner portion which is generally indicated by the reference numeral 38, and an outer portion which in generally indicated by the reference numeral 40. The inner portion 38 comprises a circular flange 42 and a threaded stud 44. The outer portion 40 is generally pyramidal in shape, having a relatively wide base portion 46 and a pointed outer end 48. The outer portion 40 also has a threaded bore 49 for receiving the threaded end of the stud 44, see particularly FIG. 8.

The pin 36 is attached to the sheet 12 by inserting the stud 44 through the aperture 20, until the flange 42 engages the surface 16 of the sheet, and the threaded end of the stud extends beyond the surface 14. The outer portion 40 is screwed onto the stud 44 until the base 46 engages the outer surface 14 of the sheet. If the outer portion 40 of the modified pin 36 becomes worn or damaged, it can be easily replaced by a new outer portion. Also, if desired, the outer portion 40 can be replaced by another outer portion which differs from the original in terms of size and/or shape; depending on the particular nature of the job which is to be accomplished by the roller. If desired, the sheet 12 can be provided with a combination of different pins such as pins 30 and 36, and different sizes of each of these pins.

Referring to FIG. 9, there is shown a modified attaching means which is generally indicated by the reference numeral 50. The modified attaching means 50 comprises a closed loop 52 which is fixed to the sheet 12, adjacent the first end edge 18 and a rigid tongue 56 which is pivotly connected to the sheet 12, adjacent the second end edge 20. The closed loop 52 includes an outer end portion 54 which is generally parallel with the edges 18 and 20. The tongue 56 is pivotly mounted on a pin 58 which extends between a pair of ears 59, of a bracket 60, which is fixed to the outer surface 14 of the sheet 12. The tongue 56 has a plurality of grooves 62 which are parallel with the end edges 18 and 20, for engaging the end portion 54 of the closed loop 52. The sheet 12 is applied to the outer surface 35, with the drum 32, by laying the inner surface 16 of the sheet against the outer surface 35 of the drum, so that the first end edge 18 is adjacent the second end edge 20, and each tongue 56 is aligned with each closed loop 52. The tongue 56 is inserted within the loop 52, as shown in FIG. 9, and then pivoted away from the outer surface 14 about the pin 58, so that the outer end portion 54 enters one of the grooves 62. The tongue 56 is pivoted 180° back toward the surface 14. This pulls the closed loop toward the pin 58, and the edge 18, towards the edge 20 in a toggle like action. The ends of the sheet 12 are, thereby, secured under tension. Also, the amount of tension can be varied, depending on which of the grooves 62 is used It is obvious that minor changes may be made in the form and construction of the invention without departing from the material spirit thereof It is not, however, desired to confine the invention to the exact form herein shown and described, but it is desired to include all such as properly come within the scope claimed.

The invention having been thus described, what is claimed as new and desired to secure by Letters Patent is:

1. An attachment for a lawn roller having an outer cylindrical surface, said attachment comprising:
   (a) an elongated sheet of flexible material which is capable of covering the outer cylindrical surface of a lawn roller, said sheet having a first end edge, a second end edge, an inner generally flat surface for bearing against said cylindrical surface, and an outer generally flat surface which faces away from said inner face surface,
   (b) a plurality of rigid pins which are attached to said sheet and which project from said outer face surface at a right angle to said outer face surface, and
   (c) means for removably attaching said first end edge to said second end edge for removably mounting said sheet on said roller so that said pins, extend outwardly from said roller.

2. An attachment for a lawn roller as recited in claim 1, wherein said means for attaching said first and second end edges comprise:
   (a) plurality of first connectors which are fixed to said first end edge, and
   (b) a plurality of second connectors which are fixed to said second end edge, said second connectors being complementary to said first connectors and removably attachable to said first connectors.

3. An attachment for a lawn roller as recited in claim 2, wherein each of said first connectors is a buckle and each of said second connectors is a strap with at least one aperture and a free end for insertion into said buckle.

4. An attachment for a lawn roller as recited in claim 2, wherein said first connector is a closed loop having an outer end portion which is parallel with said first end edge, and said second connector is a rigid tongue which is pivotally connected to said sheet at a point which is adjacent said second end edge, said tongue having an outer broad side which has a plurality of grooves which are parallel to said second end edge for selectively receiving the outer end portion of said tongue and thereby constituting with said loop an adjustable toggle connector.

5. An attachment for a lawn roller as recited in claim 1, wherein each of said pins is removably attached to said sheet.

6. An attachment for a lawn roller as recited in claim 1, wherein said sheet is made of elastomeric material 7. An attachment for a lawn roller as recited in claim 1, wherein the outer end of each pin is pointed.

8. An attachment for a lawn roller having an outer cylindrical surface, said attachment comprising:
   (a) an elongated sheet of flexible material which is capable of covering the outer cylindrical surface of a lawn roller, said sheet having a first end edge at one end of said sheet, a second end edge at the opposite end of said sheet, an inner face surface for bearing against said cylindrical surface an outer face surface which faces away from said inner face surface, and a plurality of apertures which extend from said inner face surface to said outer face surface,
   (b) a plurality of rigid pins which extend through said apertures and which extend beyond said outer face surface, and means for removably attaching each said pin to said sheet and,
   (c) means for removably attaching said first end edge to said second end edge for removably mounting said sheet on said roller so that said pins, extend outwardly from said roller.

9. An attachment for a lawn roller as recited in claim 8, wherein each of said pins comprises an inner end which is adjacent the inner surface of said sheet and an outer end which is spaced from the outer surface of said sheet, said means for attaching each of said pins to said sheet comprising:

(a) an inner flange which is fixed to the inner end of the pin so that it bears against the inner surface of said sheet, and an outer flange which is fixed to the pin between the inner and outer ends of the pin so that it bears against the outer surface of said sheet.

10. An attachment for a lawn roller as recited in claim 9, wherein said sheet is made of elastomeric material and wherein said outer flange tapers inwardly toward the outer end of the pin.

11. An attachment for a lawn roller as recited in claim 8, wherein each of said pins comprises:
 (a) an outer portion which includes said outer flange,
 (b) an inner portion which includes said inner flange, and
 (c) means for removably attaching said outer portion to said inner portion.

12. An attachment for a lawn roller as recited in claim 11, where-in one of said inner and outer portions has a threaded stud and the other of said inner and outer portions has a threaded bore for receiving said stud.

* * * * *